(12) United States Patent
Dong et al.

(10) Patent No.: US 8,873,007 B2
(45) Date of Patent: Oct. 28, 2014

(54) LIQUID CRYSTAL DISPLAY DEVICE

(75) Inventors: Chengcai Dong, Shenzhen (CN); Jehao Hsu, Shenzhen (CN); Jingfeng Xue, Shenzhen (CN); Xiaohui Yao, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 181 days.

(21) Appl. No.: 13/380,897

(22) PCT Filed: Dec. 19, 2011

(86) PCT No.: PCT/CN2011/084233
§ 371 (c)(1),
(2), (4) Date: Dec. 26, 2011

(87) PCT Pub. No.: WO2013/086748
PCT Pub. Date: Jun. 20, 2013

(65) Prior Publication Data
US 2013/0155365 A1  Jun. 20, 2013

(51) Int. Cl.
G02F 1/1343 (2006.01)

(52) U.S. Cl.
USPC .......................................................... 349/139

(58) Field of Classification Search
USPC .................................................. 349/139, 111
See application file for complete search history.

(56) References Cited

U.S. PATENT DOCUMENTS 7,929,095 B2 * 4/2011 Lin ............................... 349/139
2008/0186439 A1 * 8/2008 Kwon et al. .................. 349/139

* cited by examiner

Primary Examiner — Wen-Ying P Chen

(57) ABSTRACT

A liquid crystal display device is disclosed, comprising a first substrate, a second substrate and a liquid crystal layer. The first substrate comprises gate lines and a first transparent electrode while the second substrate is provided with a second transparent electrode. Relative to the first substrate, the inner side of the second substrate is separated into a first zone and a second zone. The first zone is locations on the second substrate to which the gate lines correspond, and the second zone is located aside to the locations on the second substrate that correspond to the gate lines. The second transparent electrode is disposed in the second zone. The liquid crystal display device of the present invention is capable of reducing parasitic capacitance of gate lines preferably, enabling the signal delay to subside in the gate lines.

14 Claims, 3 Drawing Sheets

LIQUID CRYSTAL DISPLAY DEVICE

BACKGROUND OF THE INVENTION

1. Field of the Invention

The present invention relates to liquid crystal display domain. More particularly, the present invention relates to a liquid crystal display device that is capable of reducing parasitic capacitance of gate lines.

2. Description of the Prior Art

FIG. 1 is a schematic diagram of the structure of a liquid crystal display device of conventional techniques where the liquid crystal display device 100 comprises a first substrate 110, a second substrate 120 and a liquid crystal layer 130 disposed between the first substrate 110 and the second substrate 120. The first substrate 110 comprises gate lines and a first transparent electrode, and the second substrate 120 is provided with a second transparent electrode 121.

In conventional liquid crystal display devices, a parasitic capacitance in the gate line 111 is the main reason to causes its signal delay. Supposing that the parasitic capacitance is oversized, serious signal delay would give rise to color spots (mura) on the liquid crystal display device 100.

The parasitic capacitances existed in the gate line 111 comprise the following two categories:

1.) The parasitic capacitance forms between the gate line 111 and the data line (not shown in the figure) (the insulation thin film layer between the gate line 111 and the data line is acted as the dielectric medium);
2.) The parasitic capacitance forms between the gate line 111 and the second transparent electrode 121 on the second substrate 120 (the liquid crystal layer 130 is acted as the dielectric medium).

Accordingly, to reduce the two categories of parasitic capacitances in the gate line is the goal for the designers of the liquid crystal display device to endeavor.

Therefore, it is quite imperative to provide a liquid crystal display device, to settle the existing issues of the conventional techniques.

SUMMARY OF THE INVENTION

The objective of the present invention is to provide a liquid crystal display device capable of reducing parasitic capacitance formed between a gate line and a transparent electrode on a substrate at the other side, to settle the technical issue occurred by oversized parasitic capacitance of the gate line of the liquid crystal display device that gives rise to serious signal delay.

To settle the aforementioned issue, the present invention provides a technical solution as follows:

The present invention relates to a liquid crystal display device, comprising a first substrate, a second substrate and a liquid crystal layer disposed in between the first substrate and the second substrate. The first substrate comprises gate lines and a first transparent electrode, and the second substrate is provided with a second transparent electrode. Relative to the first substrate, the inner side of the second substrate is separated into a first zone and a second zone. The first zone is locations on the second substrate to which the gate lines correspond, and the second zone is located aside to the locations on the second substrate that correspond to the gate lines. The second transparent electrode is disposed in the second zone. The second substrate further comprises a color filtering layer, and the second transparent electrode is disposed on the color filtering layer.

The present invention further relates to a liquid crystal display device, comprising a first substrate, a second substrate and a liquid crystal layer disposed in between the first substrate and the second substrate. The first substrate comprises gate lines and a first transparent electrode, and the second substrate is provided with a second transparent electrode. Relative to the first substrate, the inner side of the second substrate is separated into a first zone and a second zone. The first zone is locations on the second substrate to which the gate lines correspond, and the second zone is located aside to the locations on the second substrate that correspond to the gate lines. The second transparent electrode is disposed in the second zone.

In the liquid crystal display device of the present invention, the second substrate comprises a third transparent electrode, and the third transparent electrode is disposed on the first zone.

In the liquid crystal display device of the present invention, the third transparent electrode is connected to the signal input end of the corresponding gate line.

In the liquid crystal display device of the present invention, the third transparent electrode is connected to the gate line.

In the liquid crystal display device of the present invention, the third transparent electrode is connected to the gate line through a transfer.

In the liquid crystal display device of the present invention, the transfer is disposed at the inactive area of the liquid crystal display device.

In the liquid crystal display device of the present invention, the third transparent electrode is connected to the gate line through a conductive post.

In the liquid crystal display device of the present invention, the conductive post is disposed at the active area of the liquid crystal display device.

In the liquid crystal display device of the present invention, the conductive post is made of conductive polymeric materials.

The advantages of realizing the present invention comprise: substantially reducing the parasitic capacitance between the gate line and the second transparent electrode, which subsides the signal delay of the gate line, to avoid color spots of the liquid crystal display device due to oversized parasitic capacitance in the gate line.

This invention is detailed described with reference to the following preferred embodiments and the accompanying drawings for better comprehension.

DETAILED DESCRIPTION OF THE INVENTION

The following embodiments are described with reference to the following accompanying drawings which exemplify the realizations of this invention.

Figure 1:
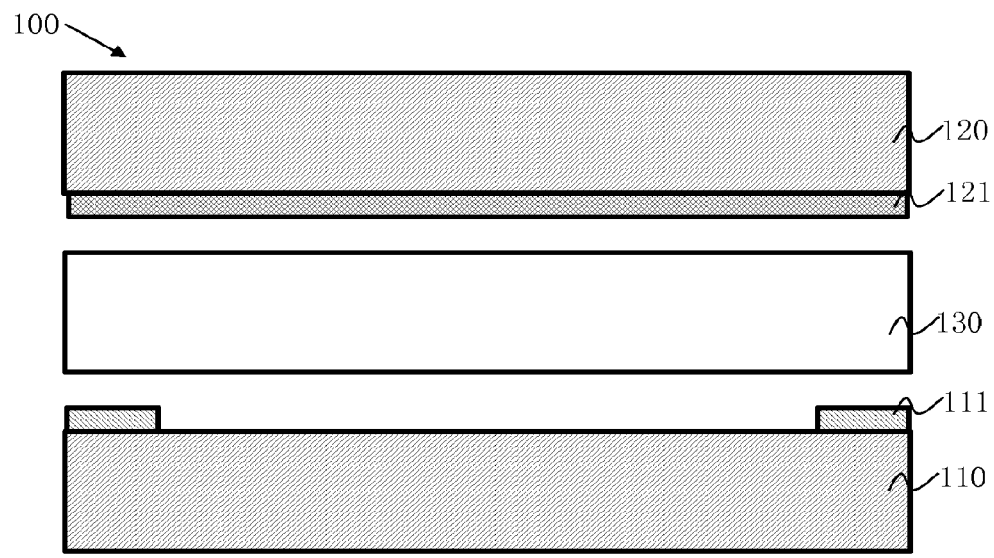
FIG. 1 is a schematic diagram of the structure of a liquid crystal display device of conventional techniques.
Figure 2:
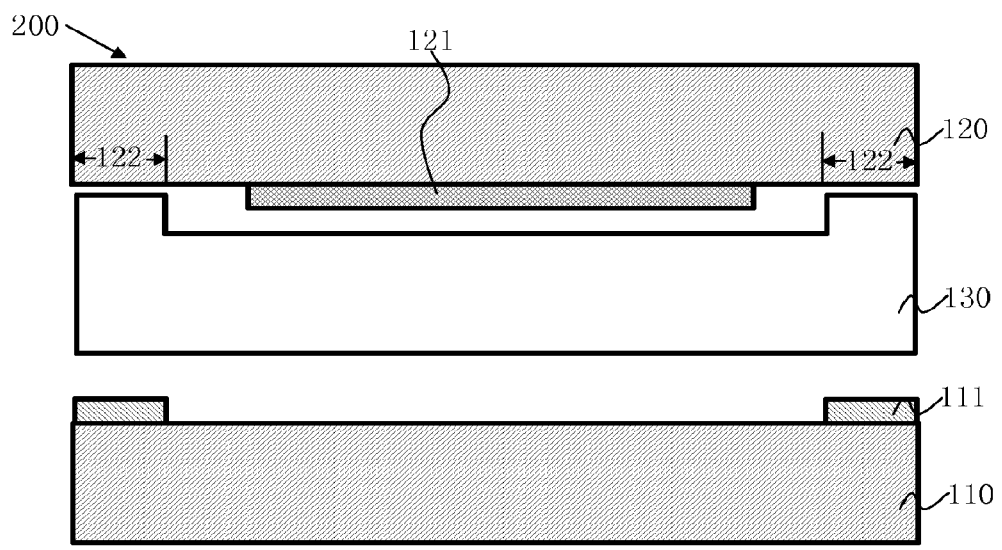
FIG. 2 is a schematic diagram of the structure of the liquid crystal display device of the first preferred embodiment of the present invention.

FIG. 2 is a schematic diagram of the structure of the liquid crystal display device of the first preferred embodiment of the present invention. In the present embodiment, the liquid crystal display device 200 comprises a first substrate 110, a second substrate 120 and a liquid crystal layer 130 disposed in between the first substrate 110 and the second substrate 120. The first substrate 110 comprises gate lines 111 and a first transparent electrode (not shown in the figures), and the second substrate 120 is provided with a second transparent electrode 121. Relative to the first substrate 110, the inner side of the second substrate 120 is separated into a first zone 122 and a second zone. The first zone 122 is locations on the second substrate 120 to which the gate lines 111 on the first substrate 110 correspond (the locations on the second substrate 120 corresponding to the gate lines defined in the present invention), and the second zone is located aside to the locations on the second substrate 120 that correspond to the gate lines 111. The first zone doesn't contain the second transparent electrode 121, and the second transparent electrode 121 is disposed at the second zone of the second substrate 120. In the present embodiment, the first substrate 110 can be a glass substrate or a substrate of other substance that is provided with a thin film transistor (TFT) array, and the second substrate 120 can be a glass substrate or a substrate of other substance that is provided with a color filter (CF) layer. It is worth paying attention in some embodiments that the CF layer and the TFT array are allocated on the same substrate.

In the present embodiment, there is not any transparent electrode disposed at the first zone 122 of the second substrate 120 that corresponds to the gate lines 111 where the parasitic capacitance occurred between the gate lines 111 and the second transparent electrode 121 is ignored (the distance between the gate lines 111 and the second transparent electrode 121 is longer). And the total parasitic capacitance in the gate lines 111 is diminished. The signal delay in the gate lines 111 is subsided, which avoids color spots due to oversized parasitic capacitance in the gate lines 111 of the liquid crystal display device 200.

Figure 3:
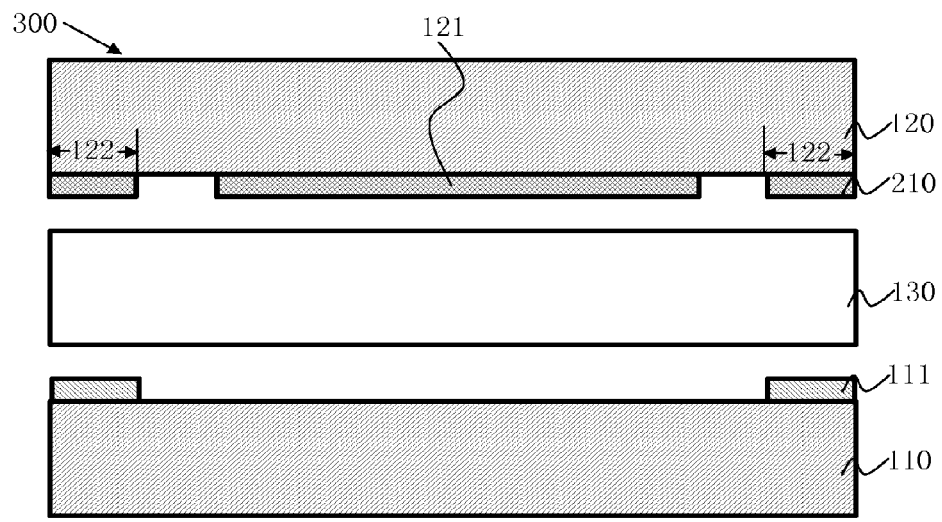
FIG. 3 is a schematic diagram of the structure of the liquid crystal display device of the second preferred embodiment of the present invention.

FIG. 3 is a schematic diagram of the structure of the liquid crystal display device of the second preferred embodiment of the present invention. The difference between the second preferred embodiment of the liquid crystal display device 300 and the first preferred embodiment: the second substrate 120 is provided with a third transparent electrode 210 disposed at the first zone 122 where the third transparent electrode 210 is connected to the signal input end of the gate lines 111.

In the present embodiment, the second transparent electrode 121 is separated from the first zone 122 on the second substrate 120 that corresponds to the gate lines 111, and the parasitic capacitance between the gate line 111 and the second transparent electrode 121 is neglected. Meanwhile, a third transparent electrode 210 is disposed at the first zone 122 of the second substrate 120 corresponding to the gate lines 11, and the third transparent electrode 210 can be separated from the second transparent electrode 121 by means of photolithography and patterning. By connecting the signal input end that is inputted to the gate lines 111 to the third transparent electrode 210, which enables the third transparent electrode 210 and the relevant gate line 211 to be at the same electric potential that eliminates the capacitance between the third transparent electrode 210 and the gate lines 111, and substantially diminishes the overall parasitic capacitance in the gate lines 111. Also, the setup of the third transparent electrode 210 avoids the liquid crystal of the liquid crystal layer 130 to enter the first zone 122 of the second substrate 120, which enables not to affect the normal displaying of the liquid crystal display device 300.

Figure 4:
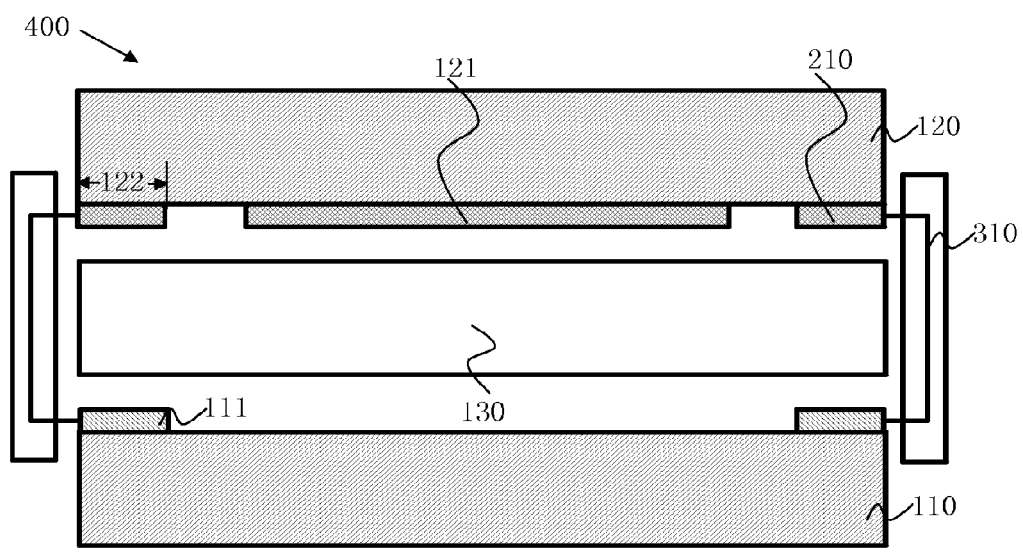
FIG. 4 is a schematic diagram of the structure of the liquid crystal display device of the third preferred embodiment of the present invention.

FIG. 4 is a schematic diagram of the structure of the liquid crystal display device of the third preferred embodiment of the present invention. The difference between the third preferred embodiment of the liquid crystal display device 400 and the second preferred embodiment: the third transparent electrodes 210 aren't connected to the signal input end of the gate lines 111, is connected to the gate lines 111 instead. In the embodiment, the third transparent electrodes 210 are connected to the gate lines 111 by means of a transfer 310 where the transfer 310 is disposed at the inactive area of the liquid crystal display device 400.

In the present embodiment, the second transparent electrode 121 is separated from the first zone 122 on the second substrate 120 that corresponds to the gate lines 111, and the parasitic capacitance between the gate lines 111 and the second transparent electrode 121 is neglected. Meanwhile, a third transparent electrodes 210 are disposed at the first zone 122 of the second substrate 120 corresponding to the gate lines 111, and the third transparent electrodes 210 are connected to the gate lines 111 by means of a transfer 310 (the transfer is often used to connect the common line of the first substrate 110 to the gate lines 111 located on the transparent electrode (for instance: the second transparent electrode 121) of the second substrate 120), which makes the third transparent electrode 210 and the corresponding gate line 111 to be at the same electric potential that substantially diminishes the parasitic capacitance between the third transparent electrode 210 and the corresponding gate line 111 to zero, and the overall parasitic capacitance in the gate line 111 is dropped. Since the transfer 310 is disposed at the inactive area of the liquid crystal display device 400, the present embodiment is realized by connecting the gate lines 111 to the third transparent electrodes 210 respectively by means of the transfer 310 after the fabrication of the first substrate 110, the second substrate 120 and the corresponding liquid crystal layer 130, which enables the third transparent electrode 210 and the corresponding gate line 111 to be at the same electric potential. Since the fabrication technique of the transfer 310 is matured, the realizing the present embodiment is easy.

Figure 5:
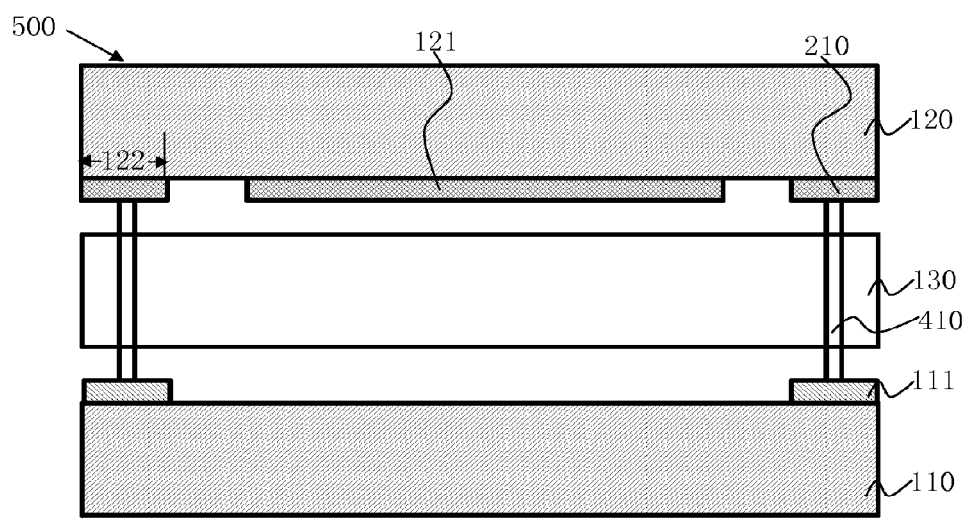
FIG. 5 is a schematic diagram of the structure of the liquid crystal display device of the fourth preferred embodiment of the present invention.

FIG. 5 is a schematic diagram of the structure of the liquid crystal display device of the fourth preferred embodiment of the present invention. The difference between the fourth preferred embodiment of the liquid crystal display device 500 and the second preferred embodiment: the third transparent electrodes 210 aren't connected to the signal input end of the gate lines 111, are connected to the gate lines 111 instead. In the embodiment, the third transparent electrodes 210 are connected to the gate lines 111 respectively by means of a conductive post 410 where the conductive post 410 can be fabricated by adopting the technique for fabricating photo spacer. Therefore, the conductive post 410 is disposed at the active area of the liquid crystal display device 500, and the substances to fabricate the conductive post 410 generally are polymeric materials (polyphenylene sulfide; polyaniline and the like).

In the present embodiment, the second transparent electrode 121 is separated from the first zone 122 on the second substrate 120 that corresponds to the data line 111, and the parasitic capacitance between the gate line 111 and the second transparent electrode 121 is neglected. As third transparent electrodes 210 are located at the first zone 122 on the second substrate 120 that correspond to the gate lines 111, the third transparent electrodes 210 are connected to the gate lines 111 respectively by means of a conductive post 410, which enables the third transparent electrode 210 and the corresponding gate line 111 to be at the same electric potential that substantially diminishes the parasitic capacitance between the third transparent electrode 210 and the gate line 111 to zero, and the overall parasitic capacitance in the gate line 111 is dropped. Due to the setup of the conductive posts 410 are in the active area of the liquid crystal display device 500, which means the fabrication of the conductive posts 410 cannot be done after the fabrication of the liquid crystal display device 500; therefore, the fabrication of the conductive posts 410 has to be synchronized with that of the color filter layer, the conductive post 410 is then free of being affected by the consecutive processes, which means the sound electric conduction of the conductive post 410 is then assured.

In general, although a few embodiments of the present invention have been disclosed, the above preferred embodiments are not used for limiting this invention, and it will be understood by those of ordinary skill in the art that various changes in form and details may be made therein without departing from the spirit and scope of the present invention.

What is claimed is:

1. A liquid crystal display device, comprising a first substrate, a second substrate and a liquid crystal layer disposed in between the first substrate and the second substrate, wherein the first substrate comprises gate lines and a first transparent electrode, and the second substrate is provided with a second transparent electrode, characterized in that: relative to the first substrate, the inner side of the second substrate is separated into a first zone and a second zone, wherein the first zone is locations on the second substrate to which the gate lines correspond, and the second zone is located aside to the locations on the second substrate that correspond to the gate lines, the second transparent electrode being disposed in the second zone; the second substrate further comprising a color filter layer, and the second transparent electrode being disposed on the color filter layer; wherein the second substrate comprises a third transparent electrode, and the third transparent electrode is disposed on the first zone; the third transparent electrode is connected to the gate line.

2. The liquid crystal display device as claimed in claim 1, characterized in that: the third transparent electrode is connected to the signal input end of the corresponding gate line.

3. The liquid crystal display device as claimed in claim 1, characterized in that: the third transparent electrode is connected to the gate line by means of a transfer.

4. The liquid crystal display device as claimed in claim 3, characterized in that: the transfer is disposed at an inactive area of the liquid crystal display device.

5. The liquid crystal display device as claimed in claim 1, characterized in that: the third transparent electrode is connected to the gate line by means of a conductive post.

6. The liquid crystal display device as claimed in claim 5, characterized in that: the conductive post is disposed at an active area of the liquid crystal display device.

7. The liquid crystal display device as claimed in claim 5, characterized in that: the conductive post is made of conductive polymeric materials.

8. A liquid crystal display device, comprising a first substrate, a second substrate and a liquid crystal layer disposed in between the first substrate and the second substrate, wherein the first substrate comprises gate lines and a first transparent electrode, and the second substrate is provided with a second transparent electrode, characterized in that: relative to the first substrate, the inner side of the second substrate is separated into a first zone and a second zone, wherein the first zone is locations on the second substrate to which the gate lines correspond, and the second zone is located aside to the locations on the second substrate that correspond to the gate lines, the second transparent electrode being disposed in the second zone; wherein the second substrate comprises a third transparent electrode, and the third transparent electrode is disposed on the first zone; the third transparent electrode is connected to the gate line.

9. The liquid crystal display device as claimed in claim 8, characterized in that: the third transparent electrode is connected to the signal input end of the corresponding gate line.

10. The liquid crystal display device as claimed in claim 8, characterized in that: the third transparent electrode is connected to the gate line by means of a transfer.

11. The liquid crystal display device as claimed in claim 10, characterized in that: the transfer is disposed at an inactive area of the liquid crystal display device.

12. The liquid crystal display device as claimed in claim 8, characterized in that: the third transparent electrode is connected to the gate line by means of a conductive post.

13. The liquid crystal display device as claimed in claim 12, characterized in that: the conductive post is disposed at an active area of the liquid crystal display device.

14. The liquid crystal display device as claimed in claim 12, characterized in that: the conductive post is made of conductive polymeric materials.

* * * * *